June 20, 1944.  J. WEISBAUM  2,351,891
DECOY AIRPLANE
Filed Nov. 16, 1942   3 Sheets-Sheet 1
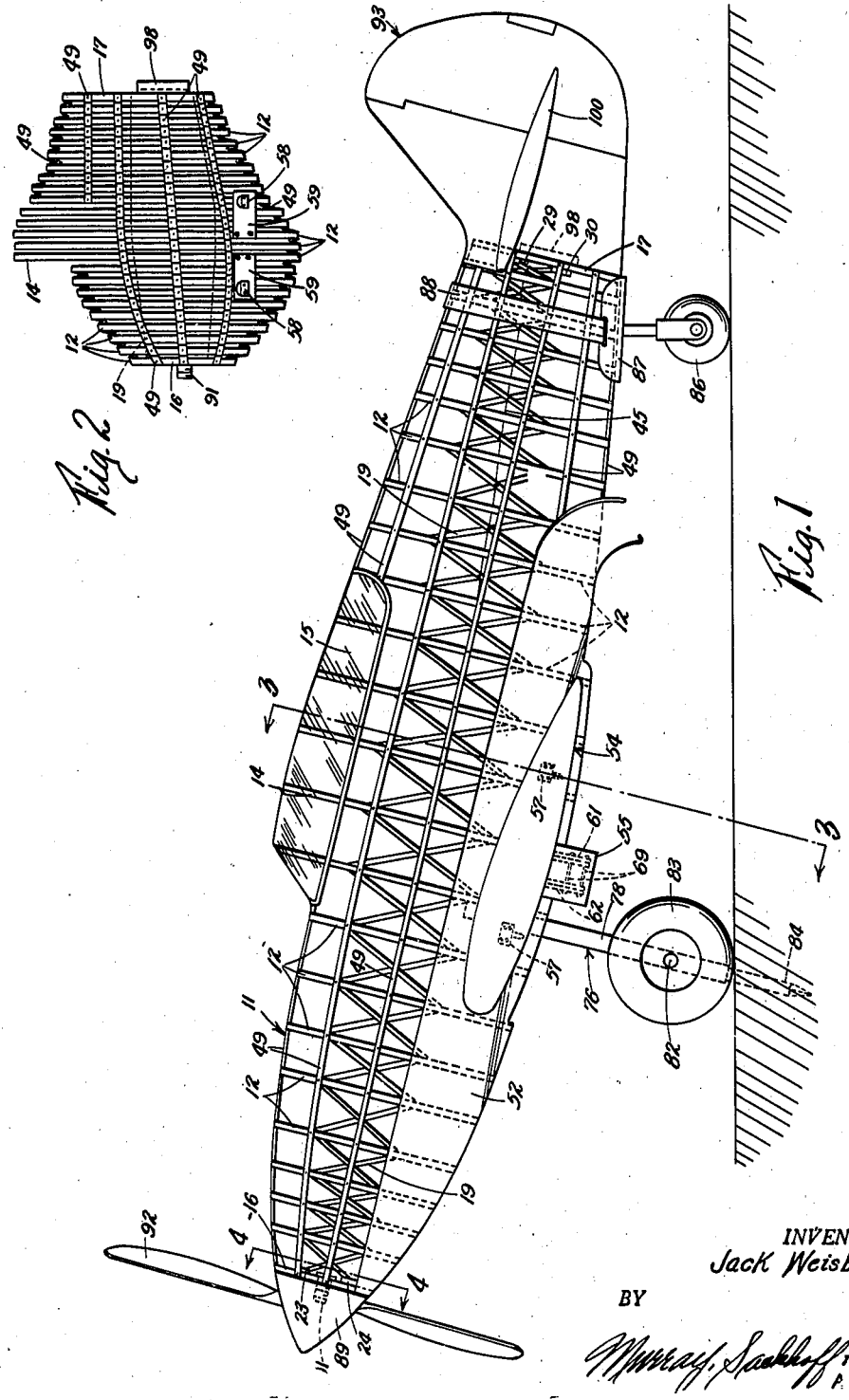
INVENTOR.
Jack Weisbaum
BY

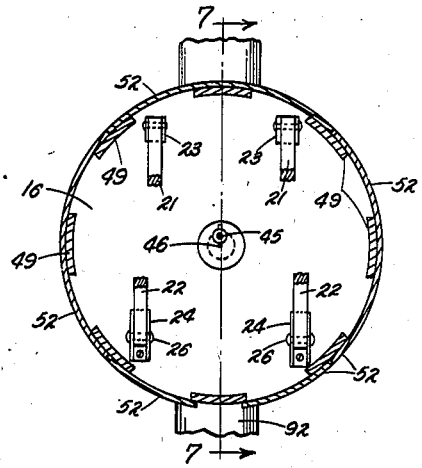
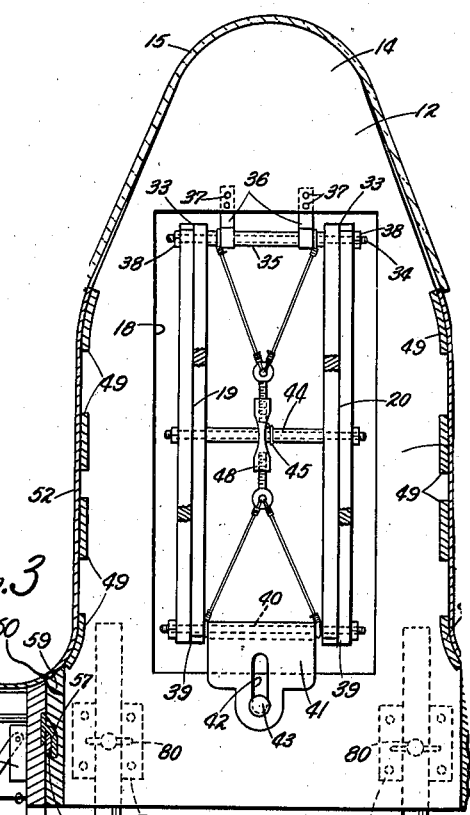

June 20, 1944. J. WEISBAUM 2,351,891
DECOY AIRPLANE
Filed Nov. 16, 1942 3 Sheets-Sheet 3

INVENTOR.
Jack Weisbaum
BY
Murray, Sackhoff & Peddick
ATT'YS

Patented June 20, 1944

2,351,891

UNITED STATES PATENT OFFICE 2,351,891

DECOY AIRPLANE

Jack Weisbaum, Cincinnati, Ohio

Application November 16, 1942, Serial No. 465,650

7 Claims. (Cl. 35—25)

The present invention relates to a full sized, simulated airplane for decoy purposes and is particularly directed to an articulated fuselage and/or wing structure for this type of airplane which may be collapsed for transportation or extended to an operative position when required.

An object of this invention is to provide a decoy airplane which may be manufactured, shipped and erected at a cost which is but a small percentage of the cost of an actual airplane.

It is another object of this invention to provide a collapsible and extensible structure which may be readily set up to simulate a full-sized airplane so that enemy reconnaissance, even with the assistance of photographic equipment, could not distinguish said structure from an actual airplane.

Another object of the invention is to provide a decoy unit which may be stored in a comparatively small space for transportation and which may be extended to a rigid, operative position in a quick and efficient manner.

Another object of the invention is to provide a collapsible decoy airplane which in operative, extended position has sufficient rigidity to withstand the forces of the elements such as winds and storms, etc.

A further object of the invention is to provide a simplified structure which will simulate in every observable detail the lines of a full sized airplane and which is practical as an all-weather decoy for enemy observation.

A still further object of the invention is to provide a novel arrangement of parts in a simulated airplane which produces economies in its manufacture, simplifies the number and function of parts and provides a practical decoy airplane for all military uses.

These and other objects are attained by the means described herein and exemplified in the accompanying drawings, in which:

Fig. 1 is a side elevational view of the decoy airplane with sections of the cover removed therefrom.

Fig. 2 is a side elevational view of the decoy airplane fuselage in collapsed position with the wings, nose, tail, wheel supports, and cockpit shell removed therefrom.

Fig. 3 is an enlarged fragmental cross-sectional view taken on line 3—3 of Fig. 1.

Fig. 4 is an enlarged cross-sectional view taken on line 4—4 of Fig. 1.

Fig. 5 is a cross-sectional view taken on line 5—5 of Fig. 3.

Figure 7:
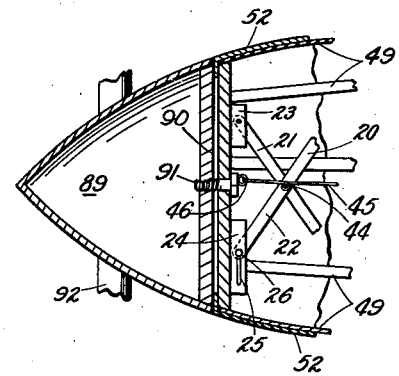
Fig. 7 is a cross-sectional view taken on line 7—7 of Fig. 4, illustrating the details of the nose portion of the airplane.

The device of this invention consists of a collapsible or expansible structure which is adapted to simulate a full-sized airplane when it is set up in operative position. The decoy airplane is shown in Fig. 1 as having the fuselage 11 in extended, operative position, said fuselage having a number of transverse frame members 12 disposed in spaced parallel positions. Each of the frame members has a particular lateral shape adapted to carry out the streamlined longitudinal contour of said fuselage. For example, the frame member shown in Fig. 3 is disposed substantially in the center of the fuselage and has a rectangular lower portion 13 with its greatest dimension in the vertical plane and having a conically shaped top portion 14, the latter being adapted to support the cockpit shell 15, while the front member, shown in Fig. 4 is relatively small and has a circular form.

Figure 9:
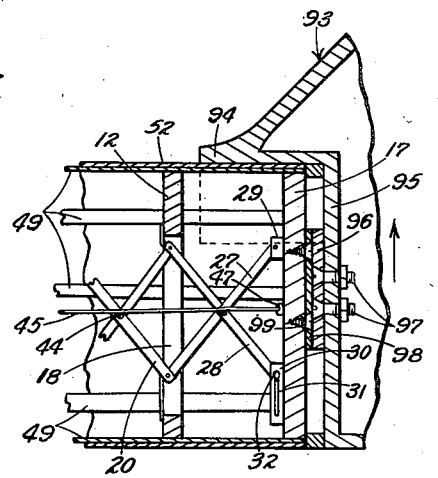
Fig. 9 is an enlarged cross-sectional view taken on line 9—9 of Fig. 8.

All the frame members except the front member 16 and the rear member 17 are provided with centrally disposed openings 18 (Figs. 3 and 9). All of said openings 18 have the same horizontal dimension while the vertical dimension is determined by the longitudinal position of its frame member in the fuselage for purposes to be explained hereinafter.

The openings 18 in the frame members are in longitudinal alignment with each other for the reception of a pair of spaced lazy tongs 19—20 which are vertically disposed and extend the entire longitudinal dimension of the fuselage. As most clearly shown in Figs. 4 and 7, the end bars 21 and 22 for each pair of lazy tongs are pivoted to the front frame member by brackets 23 and 24, respectively, the bracket 24 being provided with a vertical slot 25 in which a pin 26, fastened to the bar 22, moves when the tongs are expanded or collapsed.

The other ends of the pair of lazy tongs are pivoted to the rear frame member 17 in a manner similar to that in which the front bars of said tongs are fastened and, as shown in Fig. 9, the end bars 27 and 28 are pivoted in brackets 29 and 30 fastened to the front face of said member, the lower bracket 30 having a slot 31 therein in which a pin 32 moves when the tongs are expanded or collapsed.

As stated above, the openings 18 have different vertical dimensions for permitting the lazy tongs to pass longitudinally through them, for, as it will be noted, the individual levers of the tongs increase in length as the central part of the fuselage is approached from either the front or rear end of said fuselage, while a substantial part of said central portion has lazy joints of equal length.

A frame member 12 is joined to each of a succession of joints 33 along the upper reach of said lazy tongs 19—20, and, as most clearly shown in Fig. 3, a cross pin 34 pivotally connects the transversely aligned joints of the lazy tongs. The central portion of said pin is passed through a sleeve 35 mounted on the frame by means of spaced brackets 36 which encircle said sleeve at their lower ends and are fastened at their upper ends to the frame by means of bolts 37. The adjacently disposed bars of each set of lazy tongs are pivotally held upon the cross pin 34 by means of bolts 38 which are threaded to each end of the cross pin and are adapted to hold the bars against the ends of the sleeve. The lower reaches of the pair of lazy tongs are connected at their joints 39 by a cross pin 40 which is engaged at its central portion by a guide plate 41 provided with an elongated slot 42. A bolt 43 fastened to the lower part of the frame member 12 is received in the slot 42, said plate thereby being adapted to move in a vertical direction relative to said bolt when the pair of lazy tongs is either extended or collapsed. The diagonal bars of each pair of lazy tongs are pivotally joined at their intermediate portions by means of cross pins 44, as most clearly shown in Figs. 3, 7, and 9. These intermediate cross pins 44 are engaged by a flexible wire cable 45 which is fastened to the front frame member 16 by an eye 46 and to the rear frame member by an eye 47. The cable is looped about each of the intermediate cross pins and when said fuselage is extended, functions as a means for limiting the longitudinal extension of said fuselage. The loops may be soldered to the central exterior surface of the cross pins, to hold the cable in a longitudinal position within the lazy tongs, and to fix the maximum extension between adjacent cross pins. This particular mounting of the upper and lower reaches of the lazy tong joints to each frame member permits the tongs to carry the weight of the fuselage along their upper reach, while the joints along the lower reach of the tongs are guided in a vertical direction relative to the frame member by the guide plates 41, which in effect, hold the frame members in parallel spaced relationship when they are moved longitudinally to opened or closed fuselage positions. Furthermore, lateral rigidity of the fuselage in extended position results from the use of two lazy tongs spaced in adjacent relationship with their joints connected by cross pins.

To obtain greater rigidity for the tongs in extended position and also to hold said tongs in said position a turnbuckle 48 (Fig. 3) is interposed between the cross pins 35 and 40 disposed in the upper and lower reaches respectively, of the lazy tongs. By operating said turnbuckle, the cross pins are drawn closer together, which tends to move the lazy tongs against the limiting effect of the flexible wire 45 fastened to the front and rear frame member of the fuselage.

Figure 6:
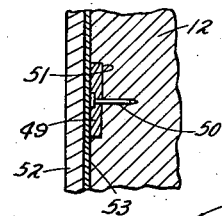
Fig. 6 is a detailed view in cross-section illustrating means for fastening the covering to the airplane body.

In extended position, each frame member is connected by a series of longitudinally disposed fabric strips 49 which extend completely around the outer surface of the frame members and are fastened at their ends to the front and rear frame members. As shown in Fig. 6, these fabric strips are counter-sunk in the outer edges of the frame members 12 so that the outer surfaces of said strips are flush with the edges of said frame members. The strips may be held in said insets 51 by nails 50 or by other suitable fastening means such as clips, cement, or the like.

The means for covering the fuselage framework when it is in extended position, consists of a number of previously patterned sheets of fabric, paper or other synthetic covering materials 52 which are provided on their inner surfaces with a non-drying, pressure active adhesive 53. When said sheets are pressed against the framework in their proper position, they are adhesively fastened to the strips 49 and the longitudinal edges of the frame members 12. Each cover section is formed so that the longitudinal edges of adjacent sections abut one another in assembled position, and completely cover the entire fuselage of the airplane, excluding the area defining the cockpit opening which is capped by a transparent cockpit shell 15. These sheets of fabric, paper, or synthetic coverings, with adhesive qualities are cut in accordance with the requirements of the style of the plane and are numbered to indicate their relative positions on the fuselage and wings of the plane. The object of using adhesive covering is to provide an economical means for setting up and taking down the plane, inasmuch as the paper or other covering can be removed quickly from the fuselage and the wings.

Figure 10:
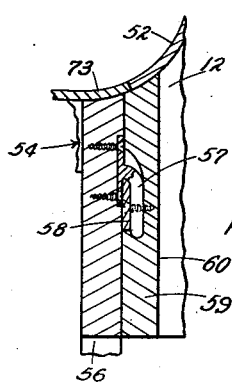
Fig. 10 is a cross-sectional view showing a means for mounting the wings on the airplane body.

The wings 54 are mounted on the fuselage when it is in extended position, and, as most clearly shown in Fig. 3, said wings are collapsible and expansible in a manner in which the fuselage itself is operated. The wings have two spaced guide members 55 and 56, the latter having a pair of hooks 57 fastened thereon for engagement with an eye 58 (Figs. 3 and 10) formed in a mounting plate 59. The mounting plate is fastened to a flat portion 60 formed on the frame member 12 adjacent the wing position. A pair of lazy tongs 61—62 are pivotally fastened to the guide frames by brackets 63 and 64, said bracket 64 having a slot 65 therein, in which pin 66, fastened to the lower ends of the joints, moves when the lazy tongs are opened or closed. The upper joints of the lazy tongs are each connected to spaced parallel ribs 67 extending the width of the wing by means of brackets 68, whilst the central and lower reaches of the joints are connected by transverse cross pins 69. The longitudinal limit of motion of the guide plates 55 and 56 is determined by a flexible wire 70 fastened to said plates and which rigidly holds the lazy tongs in extended position when a turnbuckle 71 draws the upper and lower joints together. Fabric strips 72 extend the transverse distance of the wings, and as shown in Fig. 5, are inset in each rib to which they are fastened. When the wing is in extended position, previously patterned sheets of fabric, paper or a synthetic covering material 13 treated on their inner surfaces with a non-drying, pressure active adhesive substance are placed over the wing and pressed against the strips and the edges of the ribs so that said covers are adhesively fastened to them. The outer tip 74 of the wings may be mounted to their collapsible portion by means of a hinge 75, one plate of which is fastened to the guide plate 55 and the other plate fastened to said tip, so that when the wing proper is collapsed, said wing tip may be rotated on its hinge in the direction of the arrow, to a position overlying the collapsed portion of the wing.

As shown in Figs. 1 and 3, the front support 76 for the fuselage closely simulates a landing gear and comprises two spaced tubular members 77 and 78, each mounted for vertical adjustment on the frame member 12 by means of brackets 79. The brackets have a set screw 80 threaded therein, which upon tightening, secures said tubular members in any desired vertical position. Encircling the lower portion of said members are vertically adjustable sleeves 81 having formed thereon stub axles 82, which carry at their outer ends wheels 83. The means for securing the support in the ground to prevent movement of the airplane in operative position consists of telescopic pins 84 movable in the lower ends of the tubular members and having at their upper end extensions 85 adapted for movement in slots 86 formed in said tubular members. The extensions 85 serve as striking surfaces for driving the pins 84 into the ground. The rear upport for the fuselage comprises a wheel 86 suitably mounted on a circular plate 87 held beneath a number of the frame members by means of a strap 88. The strap and the plate are concealed by the fuselage cover 52 when said cover sections are applied to the framework.

Figure 8:
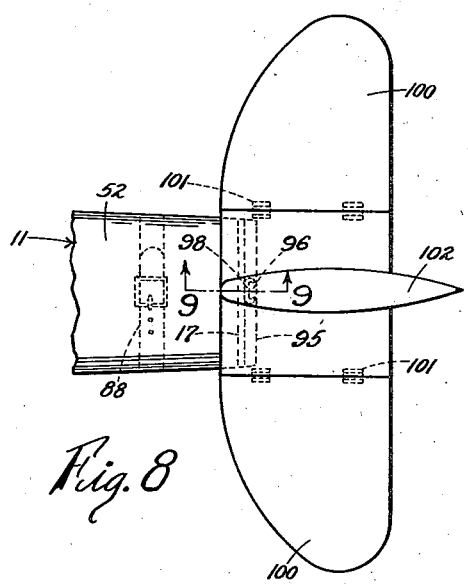
Fig. 8 is a top plan view of the tail portion of the airplane shown in Fig. 1.

The front part of the fuselage is completed by fastening a nose 89 to the front frame member 16. The nose has a web portion 90 extending across its rear, which is provided with a centrally disposed threaded opening for receiving a bolt 91 inserted in an opening formed in the front frame member 16. The nose may be provided in any suitable manner with a propeller 92. The rear of the fuselage is finished off by a tail 93 provided at its forward end with an overhanging portion 94 which rests upon the upper portion of the fuselage, the front wall 95 of said extended portion being co-extensive with the transverse form of the rear frame member 17. As most clearly shown in Figs. 8 and 9, the wall 95 has a vertically disposed tongue element 96 fastened thereto by bolts 97, which is receivable in a groove element 98 fastened to the back wall of the rear frame member 17 by screws 99. Said tail unit is therefore either mounted on, or removed from the fuselage by vertically moving the tail unit relative to the fuselage, said tail being mounted on the fuselage by the overhanging portion which rests upon the upper surface of the fuselage. As shown in Fig. 8, the elevators 100 of the tail unit may be hinged at 101 to said unit so that in collapsed position they may be rotated upwardly to a vertical position adjacent the rudder 102 of the unit.

The means for fastening the nose, wings, and tail to the fuselage are disclosed as the preferred mounting devices for the respective parts, it being understood that other mounting means may be employed or that said mounting devices described herein may be interchanged between the parts.

It is also contemplated that only the top half of the airplane fuselage described herein could be effectively used as a decoy under certain conditions in which case the fuselage may be articulated in the manner illustrated for collapsing and expanding the wings.

While there is shown and described herein certain specific structure directed to a particular style or type of airplane to be used as a decoy, it will be manifest to those skilled in the art that various modifications relating to size, strength and weight of parts and their rearrangements to meet these conditions may be made without departing from the spirit and scope of the invention, and that the same is not limited to the particular form of decoy airplane herein shown and described, except insofar as indicated by the appended claims.

What is claimed is:

1. In a simulated airplane body the combination of a number of transverse frame members, a pair of spaced lazy tongs disposed longitudinally of the frame members, cross pins for interconnecting the joints of the tongs, and means for connecting a frame member to each joint of the lazy tongs along one reach thereof for articulating said frame members in a longitudinal direction.

2. In a simulated airplane body the combination of a number of transverse frame members, a pair of spaced lazy tongs disposed longitudinally of the frame members, cross pins for interconnecting the joints of the tongs, means for connecting a frame member to each joint of the lazy tongs along one reach thereof for articulating said frame members in a longitudinal direction, and a sliding connection between each joint of the lazy tongs and a frame member along the other reach of said lazy tongs.

3. In a simulated airplane body the combination of a number of parallel frame members, a pair of vertical lazy tongs disposed longitudinally of the frame members, cross pins for interconnecting similar joints of the lazy tongs, means for connecting the frame members to the joints along the upper reach of the lazy tongs for articulating said frame members in a rectilinear, longitudinal direction, means for holding said tongs in extended positions, flexible strips coextensive with the longitudinal dimension of the framework in its extended position and each fastened at spaced intervals along its length to the frame members, and a covering for the framework adhesively fastened to an edge of the frame members and to the flexible strips when said framework is in extended position.

4. In a simulated airplane the combination of an articulated framework having spaced, parallel frame members disposed in longitudinal alignment, means for articulating the frame members for rectilinear and mutual reciprocating movement, a front support for the framework comprising two spaced tubular members mounted on one member for vertical adjustment, telescopic pins in the tubular members, means for driving said pins into operative position, vertically adjustable wheels on the tubular members, a rear support for the framework, means for rigidly locking the frame members in extended position, flexible means disposed longitudinally of the framework and fastened to an edge of each frame member, and a covering for the framework adhesively fastened to the flexible means and the edges of the members when said framework is in extended position.

5. A simulated airplane body having a number of spaced, parallel frame members disposed in longitudinal alignment, and each frame member having a transverse outline adapted in extended position to form a skeleton contour of the body, means interconnecting the frame members to provide rectilinear and mutual reciprocating movement for said members between collapsed and extended positions, means for locking the frame members in extended position, longitudinal strips fastened to an edge of each frame member, and a covering for the frame members detachably fastened to the strips and the edges of the members when the body is in extended position.

6. In a collapsible body for a simulated airplane the combination of a number of spaced, articulated frame members disposed in longitudinal alignment, longitudinal strips fastened to the transverse edges of the frame members, previously patterned covers, and means for detachably securing the covers to the transverse edges of the frame members and the strips when the body is in extended position.

7. In a collapsible body for a simulated airplane the combination of a number of spaced, articulated frame members disposed in longitudinal alignment, longitudinal strips fastened to the transverse edges of the frame members, previously patterned covers, and a nondrying, pressure active adhesive on the interior surface of the covers for detachably securing said covers to the transverse edges of the frame members and the strips when the body is in extended position.

JACK WEISBAUM.